United States Patent [19]

Iijima

[11] 4,030,934
[45] June 21, 1977

[54] COLORING COMPOSITION FOR LINE- OR PATTERN- DRAWING ELEMENTS
[75] Inventor: Zenshiro Iijima, Tokyo, Japan
[73] Assignee: Kawamura Seichu Kogyo Kabushiki Kaisha, Tajimi (Gifu), Japan
[22] Filed: Apr. 24, 1975
[21] Appl. No.: 571,238
[30] Foreign Application Priority Data
Aug. 28, 1974 Japan .............................. 49-98642
Aug. 7, 1974 Japan .............................. 49-90503
[52] U.S. Cl. ..................................... 106/23; 8/82; 8/164; 101/467; 101/470; 106/27; 427/145; 427/150; 427/153
[51] Int. Cl.² ................. C08D 11/00; C08D 11/06
[58] Field of Search ................. 106/19, 20, 21, 22, 106/23, 27; 8/8; 101/469, 473; 427/150, 153, 145

[56] References Cited
UNITED STATES PATENTS

| | | | |
|---|---|---|---|
| 1,487,873 | 3/1924 | Marston et al. | 106/27 X |
| 1,787,233 | 12/1930 | Bivins | 106/22 X |
| 2,138,836 | 12/1938 | Brower | 106/27 X |
| 2,578,425 | 12/1951 | Hershkowitz | 106/19 |
| 3,843,384 | 10/1974 | Adachi et al. | 106/21 X |

Primary Examiner—J. Ziegler

[57] ABSTRACT

A coloring composition for line- or pattern-drawing elements which comprises as a base material thereof one or more acidic sublimating substances such as benzoic acid, salicylic acid and phthalic acid. Lines and/or patterns drawn with the coloring composition are easily erased by heating.

8 Claims, No Drawings

COLORING COMPOSITION FOR LINE- OR PATTERN- DRAWING ELEMENTS

BACKGROUND OF THE INVENTION

In the field of dress-making and embroidery, chalk, chalk pencil or chalk paper is used by designers to draw cutting lines or designs on cloth. Unlike the case of sketching on paper or pattern paper, the drawing of lines and/or patterns on cloth is usually effected with a chalky drawing element such as a chalk pencil or chalk paper, instead of ordinary pencils or color markers. Lines or patterns drawn with such chalky drawing elements must be capable of easy erasure after cutting or embroidering.

Coloring compositions conventionally used for line- or pattern-drawing elements are generally composed of an inorganic filler such as clay incorporated with a pigment or dye such as titanium dioxide, Madder lake, ultramarine, cadmium yellow or the like. A chalk, or more precisely, tailor's chalk is manufactured by solidifying such coloring composition in the form of a block, a chalk pencil by surrounding a core of the composition with a wooden stick holder, and a chalk paper by applying the composition onto paper or like sheet.

At an intermediate stage of the drsss-making or embroidering work when erasure of cutting lines and/or patterns drawn by designers on cloth with such a conventional coloring composition is required, such erasing work is done simply by a physical means using a brush. Using such a process, however, perfect erasure of the drawn lines or patterns is extremely difficult and a small amount of the coloring composition is usually retained on cloth. When cloth is finally treated with a steam iron or steam press, the residual coloring composition strongly adheres to cloth and causes stain of the finished dress or embroidery, thus seriously damaging commercial value of the resulting goods. In the field of dress-making and embroidery, therefore, there is a great demand for development of an improved coloring composition which can be easily erased after use.

BRIEF SUMMARY OF THE INVENTION

It is an object of this invention to provide a coloring composition for line- or pattern-drawing elements which can easily be erased when drawn as lines or patterns on cloth.

It is another object of this invention to provide a coloring composition for line- or pattern-drawing elements which can easily be erased by heating with a steam iron or the like when drawn as lines or patterens on cloth.

It is still another object of this invention to provide a line- or pattern-drawing elements which can eaily be erased by heating with a steam iron or the like when drawn as lines or patterns on cloth.

Other objects, features and advantages of this invention will be apparent more fully from the following description.

DETAILED DESCRIPTION OF THE INVENTION

It has now been found that the above mentioned objects can be attained by using an acidic sublimating substance as a base material for the coloring composition. This invention is based on the above finding.

In accordance with this invention, there is provided a coloring composition for line- or pattern-drawing elements which comprises one or more acidic sublimating substance having dispersed thereinto a coloring agent capable of developing its color under an acidic condition.

Any acidic substance having sublimating property can be used as the acidic sublimating substance for this invention. Illustrative of such substances are aromatic carboxylic acids or anhydrides thereof, such as benzoic, acid, salicylic acid and phthalic anhydride. In addition to these aromatic carboxylic acids and acid anhydrides thereof, aliphatic acids and acid anhydrides thereof such as maleic anhydride can also be used as the acidic sublimating substance. These acidic sublimating substances may be used alone or as a mixture of two or more.

The coloring agents useful in this invention are capable of being dispersed into the acidic sublimating substance and are colorless under normal conditions but can develop their color by the action of an acid. Examples of such coloring agents include lactone dyes, such as rhodamine lactone and crystal violet lactone. Rhodamine lactone is colorless under neutral or alkaline conditions but turns red under acidic conditions. Crystal violet lactone is colorless under neutral or alkaline conditins but turns blue under acidic conditions. The coloring agent is used in an amount of 0.001–0.1 parts by weight per part by weight of the acidic sublimating substance.

As the acidic sublimating substance used as the base material for the composition of this invention absorbs moisture in the air and renders itself acdic, the composition of the invention turns the color of the specific coloring agent used. Salicylic acid is a preferable base material because of its hygroscopic property. When the coloring composition is heated to a temperature of about 80° C or higher to remove the acidic sublimating substance contained therein by sublimation, the remaining coloring agent will be under neutral conditions and thus decolorized. Accordingly, lines drawn on fabric or paper with the coloring composition of this invention can be easily erased by application of heat from a suitable heating means such as a steam iron or steam press.

In the composition of this invention, the acidic sublimating substances are preferably used in the form of a mixture for promoting the sublimation rate and thus attaining effective sublimation at a lower temperature. In case the acidic sublimating substances are used in the form of a mixture, the melting point of the composition will be depressed to facilitate the operation for fusion and solidification of the composition so that moldability of the composition can remarkably be improved. A preferable composition comprises a mixture of benzoic acid, salicylic acid and phthalic anhydride. The sublimation rate of the acidic substances can also be increased by incorporating a metal salt of a higher fatty acid, such as calcium stearate or calcium oleate, into the composition. Incorporation of such a metal salt additionally improves the brittleness of the composition and imparts thereto moderate flexibility, thus bringing about a greater advantage for practical use. The metal salt of a higher fatty acid is used in an amount of 0.01–0.5 parts by weight per part by weight of the acidic sublimating substance.

Addition of gum arabic to the composition in such a porportion that 0.01–0.5 part by weight of the gum is used per part of the acidic sublimating substance is also effective in imparting flexibility to the composition.

According to this invention, chalk, as one mode of the line- or pattern-drawing elements, can be manufactured by mixing the acidic sublimating substance, the coloring agent and a metal salt of a higher fatty acid in such a proportion that 0.001–0.1 parts by weight of the coloring agent and 0.01–0.5 parts by weight of the metal salt are used per part by weight of the acidic sublimating substance, heating the mixture until fusion, casting the fused mixture into molds for the desired chalk and thereafter naturally cooling the mold solidify the composition. Chalk pencils are manufactured by adding 0.02–0.3 parts by weight of a transparent solid reinforcing agent such as a wax or parafin, for improving brittleness of the composition when shaped into leads to a mixture of one part by weight of the acidic sublimating substance, 0.001–0.1 parts by weight of the coloring agent and 0.01–0.5 parts by weight of a metal salt of a higher fatty acid, heating the mixture until fusion, pouring the fused mixture into a hollow core part of a wood stick in the form of a pencil, and thereafter cooling it to solidify the composition. Chalk paper can be manufactured by heating until fusion, a mixture of one part by weight of the acidic sublimating substance, 0.001–0.1 parts by weight of the coloring agent, 0.01–0.5 parts by weight of the metal salt and 0.02–0.3 parts by weight of the solid reinforcing agent, admixing the fused mixture with about 0.02–0.3 parts by weight of a polyalkyleneglycol, such as polyethyleneglycol or polypropyleneglycol, for improving extensibility of the composition on paper and imparting flexibility to the coated film, applying the mixture onto paper and thereafter naturally cooling the coated paper in the open air to solidify the composition.

The composition of this invention, free from the coloring agent, i.e. the composition comprising only the acidic sublimating substance and the metal of a higher fatty acid is suitable for white line- or pattern-drawing elements. A preferable white composition comprises 1 part by weight of salicylic acid, 0.1–1 part by weight of benzoic acid and 0.1–1 part by weight of phthalic anhydride having dispersed thereinto a metal salt of a higher fatty acid and gum arabic, in an amount of 0.05–0.5 and 0.01–0.5 parts by weight, respectively, per part by weight of the total acidic substances.

Line- or pattern-drawing elements manufactured from the composition of this invention, e.g. chalk, chalk pencils and chalk papers, can be used for drawing lines or patterns smoothly on various kinds of cloths. After use, the lines or patterns drawn on cloth can easily be erased simply by pressing the cloth with a heating tool such as a steam iron or steam press. In case chalk, a chalk pencil or chalk paper composed of the composition of this invention is used for drawing a cutting line or the like design on cloth, an after-treatment for erasing the lines or design drawn on the cloth in very simple and easy or so that staining of the cloth is completely avoided.

By taking advantage of the easily erasable characteristics by the action of heat, the coloring composition of this invention can be used as starting materials for manufacturing ordinary drawing elements for educational purposes, such as crayon and color pencils, in addition to the commercial uses in the field of dressmaking and embroidery.

This invention will now be understood more readily with reference to the following examples. However, these examples are given only for the purpose of illustration and are not to be construed as limiting the scope of the invention. In the examples, all parts are by weight unless otherwise indicated.

EXAMPLE 1

A mixture of 50 g of benzoic acid, 50 g of phthalic anhydride and 100 g of salicylic acid was heated until fusion. To the fused mixture were added, at 120° C 14 g of calcium sterate and 0.6 g of rhodamine lactone. The mixture was homogeneously mixed, poured into a mold and then allowed to stand in the air whereby the contents of the mold was cooled naturally and solidified to form a solid block.

The resulting solid was used as chalk to draw lines smoothly on cloth. Red lines on the cloth were easily erased by heating with a steam iron.

EXAMPLE 2

A mixture of 100 g of benzoic acid, 100 g of salicylic acid and 15 g of japan wax was heated until fusion. To the fused mixture were added, at 120° C, 20 g of calcium stearate and 1.2 g of crystal violet lactone. The mixture was homogeneously mixed, poured into a hollow core of wood stick for pencil having a diameter of 3.5 mm and then allowed to stand in the air whereby the mixture was cooled and solidified.

The pencil thus obtained was sharpened by shaving the wooden part with a knife to expose the lead and then used for drawing lines on cloth. The feeling of drawing was smooth good. The lines on the cloth colored in blue were easily erased by heating with a steam iron.

EXAMPLE 3

One hundred grams of benzoic acid and 100 g of salicylic acid were admixed with 15 g of paraffin wax and the whole was heated until fusion. To the fused mixture were added at 110° C, 14 g of calcium stearate and 1.2 g of rhodamine lactone with stirring. The mixture was further admixed with 20 g of polyethyleneglycol, having a molecular weight of 600, until homogeneous, quickly applied onto paper and allowed to stand, whereby the mixture was cooled and solidified.

Cloth was overlaid with the coated paper in such manner that the coated surface of the paper was faced with the cloth. Lines were then drawn on the backside of the paper with an iron pen whereby the lines were copied on the cloth in red The lines on the cloth were easily erased by heating with a steam iron.

EXAMPLE 4

A white chalk was manufactured by repeating the method of Example 1 except that the coloring agent was not added. Lines drawn on black cloth with this chalk were easily erased by heating with a steam iron.

EXAMPLE 5

A chalk pencil having a white lead was manufactured by repeating the method of Example 2 except that no coloring agent was added. Lines were drawn on black cloth with this chalk pencil. The feeling of drawing is good. The lines drawn on the cloth were easily erased by heating with a steam iron.

EXAMPLE 6

A white chalk paper was manufactured by repeating the method of Example 3 except that no coloring agent was added. Lines copied on black cloth from the chalk paper were easily erased by heating with a steam iron.

What is claimed is:

1. A heat-erasable coloring composition for line-or pattern-drawing elements which comprises at least one acidic sublimating substance selected from the group consisting of benzoic acid salicylic acid, phthalic anhydride, maleic anhydride and mixtures thereof, having disperse thereinto a coloring agent present in an amount 0.001-0.1 parts by weight per part of acidic subliminating substance, said coloring agent being capable of developing its color under acidic conditions and being selected from the group consisting rhodamine lactone and crystal violet lactone.

2. A composition according to claim 1, additionally comprising a metal salt of a higher fatty acid selected from the group consisting of calcium stearate and calcium oleate in an amount of 0.01-0.5 parts by weight per part of acidic sublimating substance to increase the sublimation rate of said acidic sublimating substance.

3. A composition according to claim 2 wherein said metal salt of a higher fatty acid is calcium stearate.

4. A composition according to claim 1 wherein said acidic sublimating substance is a mixture of benzoic acid, salicylic acid and phthalic anhydride.

5. A composition according to claim 1 wherein gum arabic is added in an amount of 0.01-0.5 parts by weight per part of said acidic sublimating substance.

6. A heat-erasable coloring composition for line-or pattern-drawing elements which comprises at least one acidic sublimating substance selected from the group consisting of benzoic acid, salicylic acid, phthalic anhydride, maleic anhydride and mixtures thereof, having dispersed thereinto a metal salt of a higher fatty acid selected from the group consisting of calcium stearate and calcium oleate in an amount of 0.01-0.5 parts by weight per part of said acidic sublimating substance to increase the sublimating rate of said acidic sublimating substance.

7. A composition according to claim 6, wherein said acidic sublimating substance comprises a mixture of 1 part by weight of salicylic acid, 0.1-1 part weight benzoic acid and 0.1-1 part by weight phthalic anhydride.

8. A composition according to claim 6 wherein gum arabic is added in an amount 0.01-0.5 parts by weight per part of said acidic sublimating substance.

* * * * *